Figure 1:
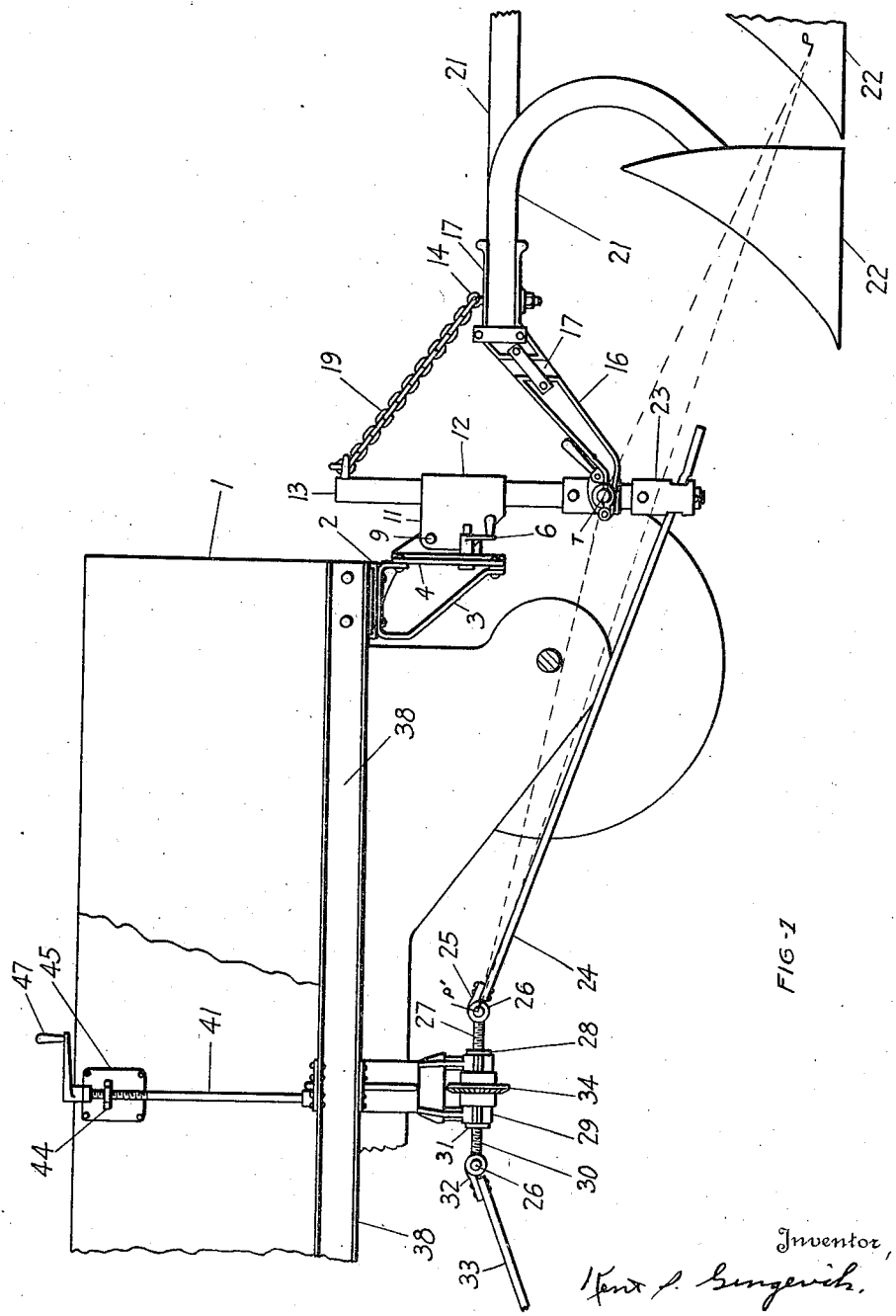

Apr. 3, 1923.

K. S. GINGERICK
PLOW DEPTH ADJUSTING DEVICE.
FILED MAY 1, 1922.

1,450,417.

3 SHEETS—SHEET 1.

Inventor,
Kent S. Gingerich.
By Howard S. Smith,
His Attorney

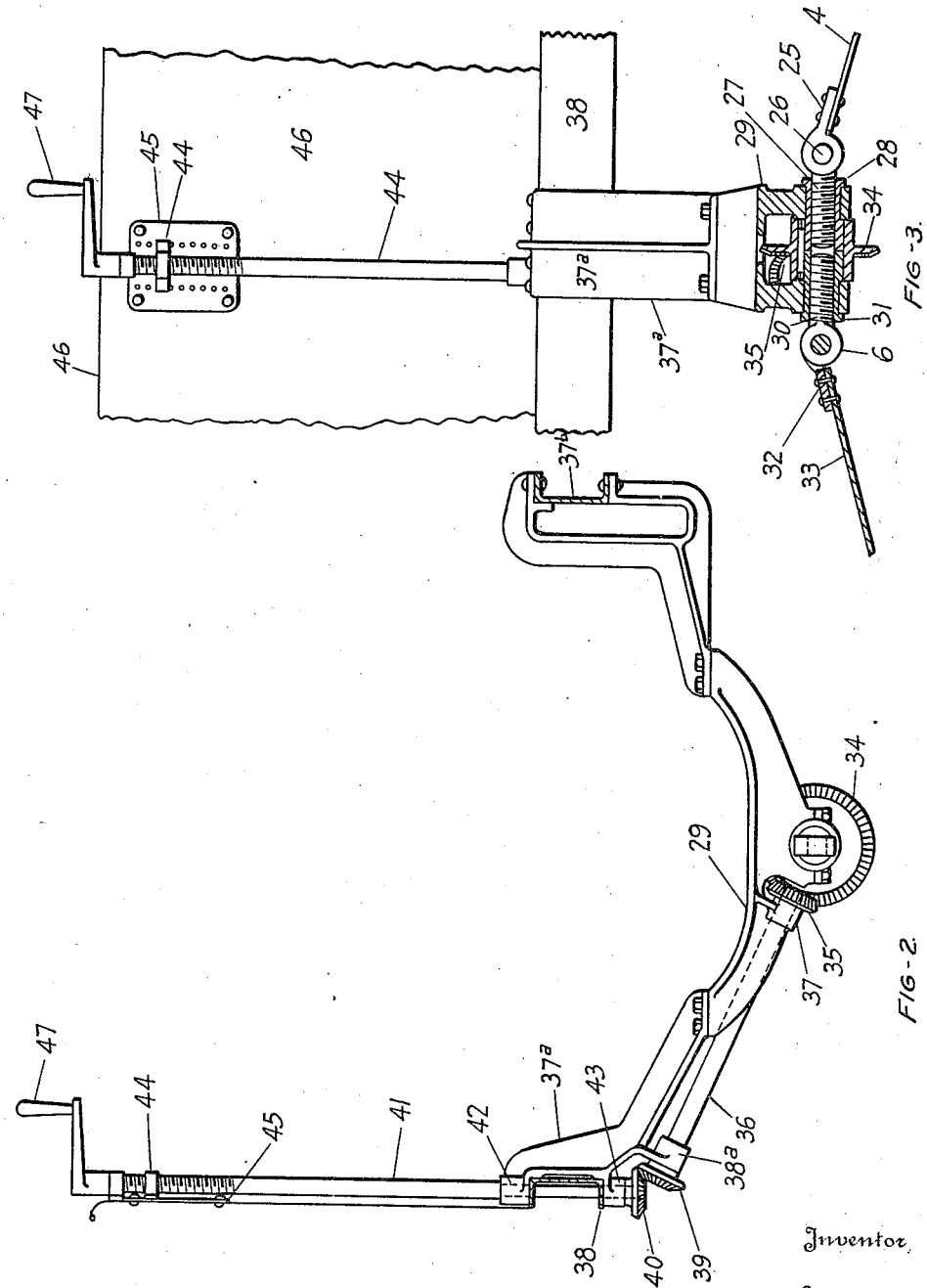

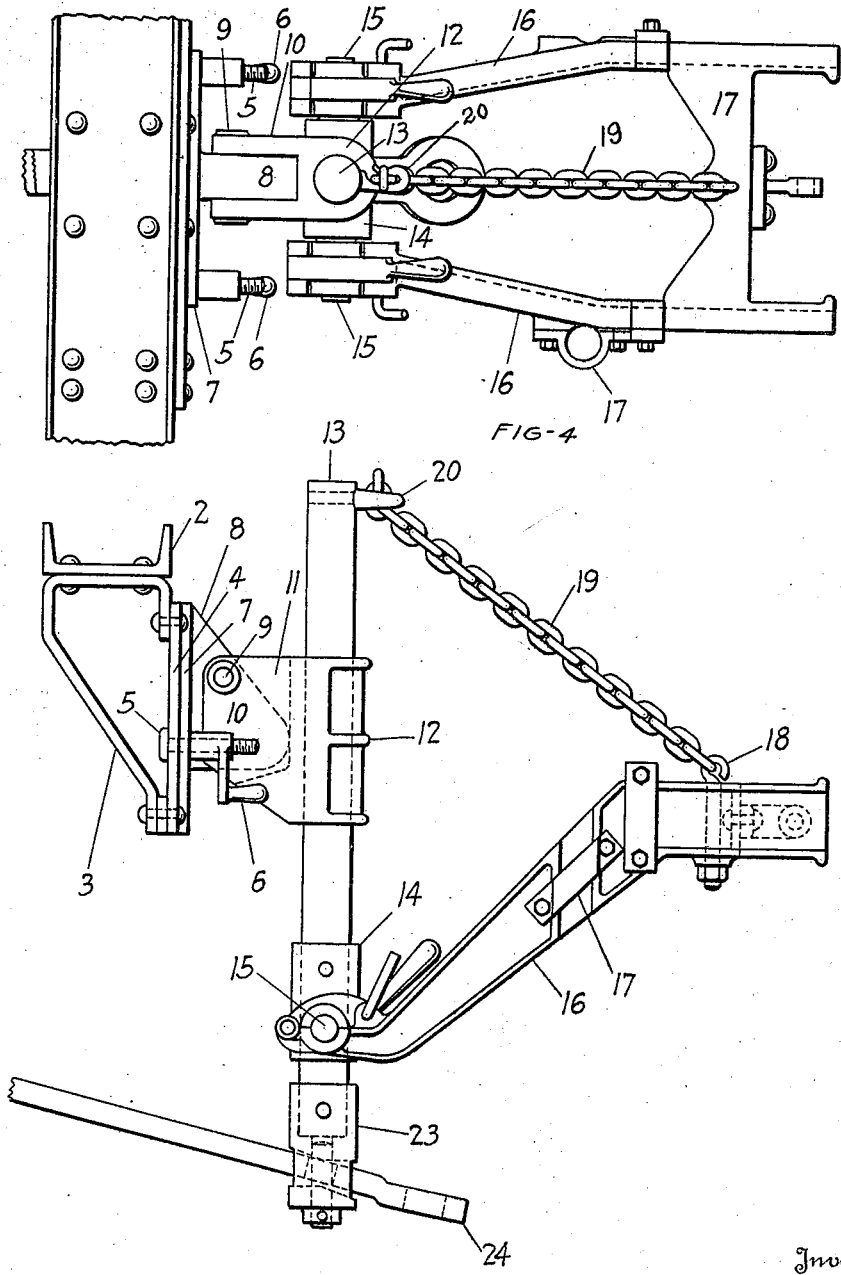

Patented Apr. 3, 1923.

1,450,417

UNITED STATES PATENT OFFICE.

KENT S. GINGERICK, OF URBANA, OHIO, ASSIGNOR TO RIAL T. PARRISH, OF DAYTON, OHIO.

PLOW-DEPTH-ADJUSTING DEVICE.

Application filed May 1, 1922. Serial No. 557,525.

*To all whom it may concern:*

Be it known that I, KENT S. GINGERICK, a citizen of the United States, residing in the city of Urbana, in the county of Champaign and State of Ohio, have invented certain new and useful Improvements in Plow-Depth-Adjusting Devices, of which the following is a specification.

The principal object of my invention is to provide for tractors, means for easily and conveniently adjusting and maintaining a plow or plows at any desirable depth in the ground.

It is well known to those skilled in the art that there is, in a plow or gang of plows, a certain theoretical point known as the point of draft of plows, which point is located at or about the center of gravity or weight of the plow or gang of plows. The ideal theoretical line of draft, or line from this point of draft to the point of attachment to the source of power, would be a line parallel to the ground and also parallel to the plow bottoms, passing through the point of draft of the plows. Since this point of draft under plowing conditions is continuously beneath the surface of the ground, it is obviously impracticable to make the point of attachment to the tractor or source of power at any point along the theoretical line of draft. The point of attachment, or draft point of the tractor, or source of power, is therefore commonly set at a higher point in the tractor body or frame, thus creating a new theoretical line of draft from the draft point of the plow or gang of plows to the draft point of the tractor.

If, then, the drawbar and plow beams were rigidly connected, the plows would remain in the ground at a certain specified depth and would not be capable of varying this depth until the tractor draft point is changed. Drawbars including plow beams as part of the theoretical drawbar are never rigid for the above reason, a joint always being provided, usually at the point of attachment of the plow beams to the drawbar proper.

It follows, therefore, that, in order to vary the plowing depth, there would be a bend in the plow attachment members at this joint between the plow beams and the drawbar proper. If this bend or angle were below the theoretical draft line, the tendency of the plow points would be to penetrate deeper into the ground, and if the bend were above the theoretical draft line, the tendency of the plow points would be to come out of the ground; in both of the above cases the specified tendency or inclination would continue until the plow draft point assumed a position sufficiently low or sufficiently high, respectively, to cause the actual bent draft line to coincide with the straight theoretical draft line.

It will be obvious, likewise, that any variation in the location of the tractor draft point which will cause the secondary theoretical draft line to approach or recede from the original theoretical draft line that is parallel to the ground, will also cause the plow points to penetrate more deeply or less deeply. respectively, into the ground. This variation of location of the tractor draft point may be made either vertically or horizontally as desired, with exactly equal results.

Since this variation may be accomplished by these two different methods, I do not desire to limit myself to the type of mechanism herein described, but by preference employ the method of shifting the tractor draft point horizontally. Furthermore, since either the horizontal or vertical adjustment of the tractor draft point may be carried out by many different arrangements or combinations of mechanical movements, I do not desire to be limited to any particular construction or arrangement, but by preference employ a combination of screws and bevel gears. Nor do I desire to limit its use on two-way plow tractors, which by preference I have employed in the accompanying drawings.

In the accompanying drawings forming a part of this specification and in which like numerals are employed to designate like parts throughout the same:

Figure 1 is a side elevational view of my plow-depth adjusting mechanism applied to the rear end of a tractor. Figure 2 is an end view of the tractor draft point mechanism, showing the saddle which is attached to the frame, bevel gears, shafting and crank, whereby the plow adjustment is placed under easy control for the operator. Figure 3 is a side view, partly in section, showing the tractor draft point mechanism at the center. Figure 4 is a plan view, and Figure 5 is a side elevation, of the common attachment point of the plow beams and draw bar proper.

Referring to the accompanying drawings, the numeral 1 designates a tractor to the rear bottom portion of which there is secured a U-shaped element 2. Riveted to the latter is a partial S-shaped bracket 3 to whose free ends there is riveted a supporting plate 4. Removably secured to the latter by bolts 5 and handle nuts 6, is a supporting member 7 from which there projects outwardly a lug 8. Pivotally secured to the latter by a pin 9, is the yoke portion 10 of a column guide 11 having an outer sleeve portion 12 through which there loosely passes a column 13. (See Figures 2, 4 and 5.)

Secured on the lower end of the column 13 is a sleeve 14 from each side of which there projects outwardly a pin 15 to which there is secured the inner end of one arm 16 of a draft yoke or main draw bar 17. Secured in the middle portion of the latter is a hook bolt 18 that receives the lower end of a chain 19, the upper end of which is connected to a looped element 20 secured to the top of the column 13. (See Figures 1, 4 and 5.)

Secured to the draft yoke 17 are plow beams 21, 21 carrying plow blades 22 whose depth in the ground is adjusted by the means now to be described. Secured on the extreme lower end of the column 13 is a sleeve 23 to which there is secured the rear end of a long draw bar 24. This bar is riveted at its front end to a knuckle member 25 pivotally secured on the right-angled end 26 of a screw 27. The latter is received by an internally threaded bushing 28 which is rotatable in a bracket 29. A similar screw 30 is received by a bushing 31 rotatable in the bracket 29 in front of the bushing 28, and to this screw there is pivotally secured a knuckle member 32 to which is riveted a front draw bar 33. (See Figures 2 and 3.)

Keyed or otherwise suitably secured to the bushings 28 and 31 within the bracket 29, is a bevel gear 34 which meshes with a bevel gear 35 fast on an inclined shaft 36 journaled at its lower end in a bearing 37 in the bracket 29. (See Figure 2.)

The bracket 29 is secured at its ends to clamping members 37ª and 37ᵇ which are adapted to be connected to the side members 38, 38 of the tractor frame as shown in Figure 2. The upper end of the inclined shaft 36 is journaled in a bearing 38ª in the clamping member 37ª, and on its upper end there is secured a bevel gear 39 which meshes with a bevel gear 40 fixedly secured to the lower end of a vertical shaft 41 journaled in bearings 42 and 43 on said clamping member. The upper end of the vertical shaft 41 is threaded to receive an indicating member or collar 44 in front of an index plate 45 secured to a side 46 of the tractor, to indicate the depth at which the plows are working. Secured to the top of the vertical shaft 41 is a crank 47 by means of which the said shaft may be turned to accomplish the following results.

When the crank 47 is turned in one direction, it will rotate the bevel gear 34 through the bevel gear 35, shaft 36, bevel gear 39, bevel gear 40 and shaft 41, to turn the bushings 28 and 31. The latter being restrained from outward movement, will, when they are turned, cause the screws 27 and 30 to move outwardly. Since the draw bar 24 is connected to the screw 27, it will be pushed rearwardly by the latter to press outwardly the lower end of the column 13 to which it is connected. The column 13 will then descend through the sleeve portion 12 of the casting 11 which will be rocked around its pivot 9 in a counterclockwise direction, thus tilting the plow beams 21, 21 so that the plow points or blades 22, 22 will tend to move more deeply into the ground; and they will continue so to descend until the plow draft point P reaches a position sufficiently low to allow the theoretical draft line P—P′ designated by dotted lines in Figure 1 to coincide with the center line of the draw bar proper.

The exact reverse of this action will occur when the crank 47 is turned in the opposite direction to cause the screw 27 to pull the draw bar 24 in a forward direction or away from the plows. This pull will force the column 13 upwardly through the sleeve portion 12 of the casting 11 as the latter is moved in a clockwise direction by the same force, thereby tilting the plow points upwardly until the theoretical draft line P—P′ and actual draft line P—T—P′ again coincide. As illustrated by the dotted lines in Figure 1, the theoretical draft line P—P′ is below the actual draft line P—T—P′; the plows then penetrate deeper into the ground until the column 13 is drawn upwardly and forwardly to a position wherein the line P—T—P′ coincides with the line P—P′. The depth of the plows (not shown) mounted in front of the tractor may be similarly controlled by the draw bar 33 which is actuated by the screw 30.

From the foregoing it will be seen that I have provided simple and efficient means whereby the depth adjustment of plows on tractors may be readily controlled. I do not wish to be limited to the details of construction and arrangement herein shown and described, and any changes or modifications may be made therein within the scope of the subjoined claims.

Having described my invention, I claim:

1. In a tractor, the combination with a plow, of a supporting member having an annular portion, pivotally secured to said tractor, a column free to move through the annular portion of said supporting member, means for securing said plow to the column, and horizontal means attached to said column for rocking it and moving it vertically through the supporting member to tilt the plow a desired degree.

2. In a tractor, the combination with a plow, of a sleeve hingedly secured to said tractor, a column passing through said sleeve, means securing said plow to the column, a draw bar secured to one end of said column, and means for moving said draw bar horizontally to rock the column and move it vertically through the sleeve to tilt the plow upwardly or downwardly a desired degree.

3. In a tractor, the combination with a plow, of a sleeve hingedly secured to said tractor, a column passing through said sleeve, means securing said plow to the column, a draw bar secured to one end of said column, a screw secured to the front end of said drawbar, a hollow member internally threaded to receive said screw, and means for turning the hollow member to impart a horizontal movement to said screw to tilt said plow upwardly or downwardly a desired degree.

4. In a tractor, the combination with a plow, of means for hingedly securing the plow to the tractor, a draw bar secured to said hinged means, a screw secured to the front end of said draw bar, a bushing internally threaded to receive said screw, a bracket in which said bushing rotates, a gear fixedly secured to said bushing, an actuating shaft supported by said bracket, and a gear on said actuating shaft in mesh with the first gear.

In testimony whereof I have hereunto set my hand this 21st day of April, 1922.

KENT S. GINGERICK.

Witness:
HOWARD S. SMITH.